May 16, 1967  CHI LIANG CHO  3,319,342
INTERNAL MICROMETER
Filed July 6, 1964
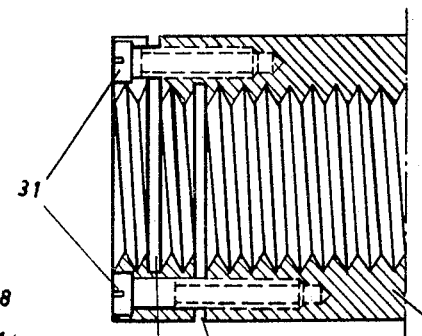
FIG.3
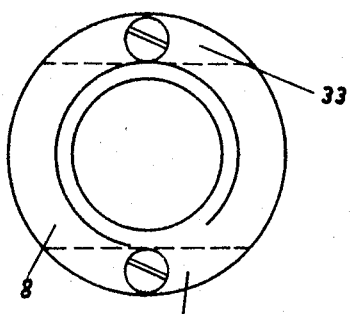
FIG.4
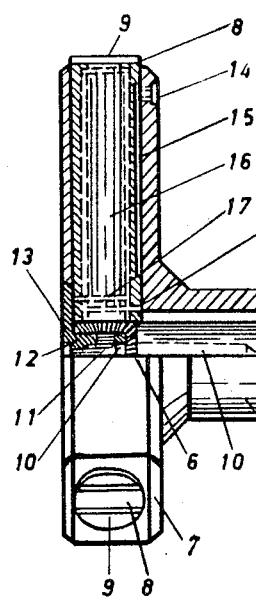
FIG.1
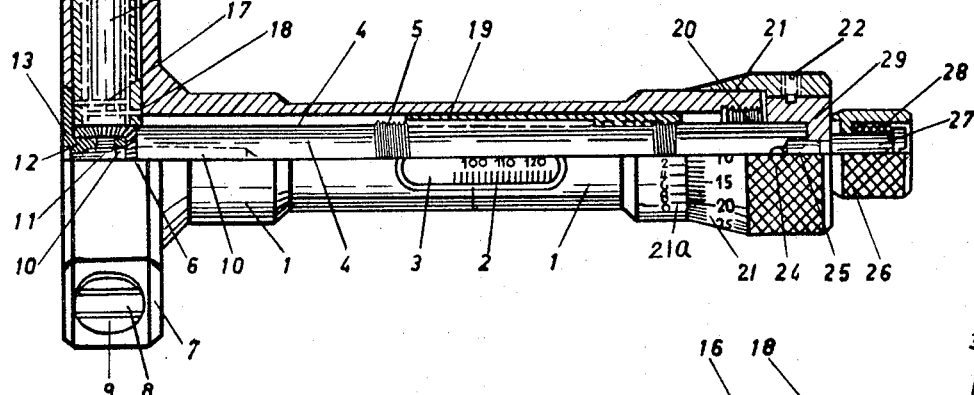
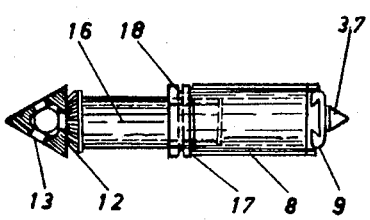
FIG.5
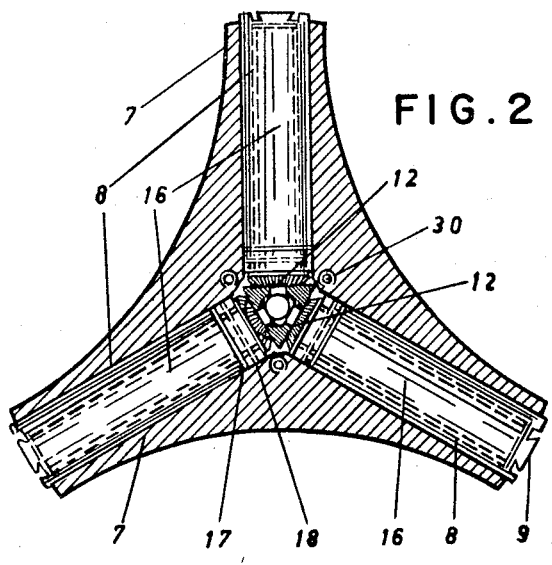
FIG.2
FIG.6
FIG.7
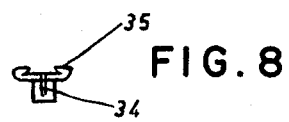
FIG.8
INVENTOR
CHI LIANG CHO
BY
ATTORNEY 3,319,342
INTERNAL MICROMETER
Chi Liang Cho, Zurich, Switzerland, assignor to
  Walter Pfister, Zurich, Switzerland
Filed July 6, 1964, Ser. No. 380,441
Claims priority, application Switzerland, July 8, 1963,
  8,497/63
4 Claims. (Cl. 33—178)

The present invention relates to an internal micrometer with three measuring probes. It is known that internal micrometers with three probes are better and more reliable than those working on the two-probe system. However, in general this system can only achieve a relatively small range of measurement owing to the limited movement of the driving cone and the short guides. The travel of the cone is limited by the housing since the cone angle must be as small as possible in the interests of accuracy, so that many changes of cone or of the whole unit are required; while as for the probes, once they protrude more than half-way out of their guides there is a danger of them wobbling, which may not only cause jamming but also has an adverse effect upon accuracy. The instrument according to the invention is designed to overcome the above disadvantages. Its principal feature is that the outward movement of the three probes is derived from a micrometer spindle working constantly in conjunction with a scale drum via bevel gears, threaded rods and threaded sleeves, in such a way that the rotational movement of the threaded rods is synchronised with that of the micrometer spindle.

This system has the following advantages:

(1) The micrometer spindle can turn any amount without moving axially, so that no more difficulties arise owing to lack of space in the axial direction, as is the case with the cone-drive system; this is of particular advantage in measuring blind holes. Threaded rods and threaded sleeves enable a range of outward travel to be achieved that is many times longer than with the cone system.

(2) The probe is guided not merely by its guide hole, but also by the close fit between the threaded rod and threaded sleeve, so that the probes can be extended much further than normal probe rods without any danger of wobble.

(3) A particularly valuable advantage is that the finest possible pitch can be used for the drive threads, for example 0.5 mm., a pitch which can practically never be reached with the driving cones of the prior art, since the sliding track of a threaded rod can be made a dozen times longer per unit than that of a cone. With the fine pitch there is no difficulty in achieving far greater accuracy by means of the thread system.

The drawings show an embodiment of the instrument according to the invention. They show:

FIG. 1 a complete view of the internal micrometer, one-half being shown in section, FIG. 2 a section through the probe head, seen from below, FIG. 3 is a sectional view of a threaded sleeve with compensating slots, FIG. 4 is an end view of the threaded sleeve shown in FIGURE 3, FIG. 5 is a side view of an extended probe with a thread-measuring point, FIG. 6 is a side view of the thread measuring point, FIG. 7 is a bottom view of an end piece showing a scale, and FIG. 8 is a side view of the end piece shown in FIG. 7.

As will be seen from the drawings, the internal micrometer consists of the following main components: housing 1 with probe head 7, threaded probes 8 and 16 with bevel gears 12, scale drums 3, 19 and 21, micrometer spindle 4 and triangular bearing 13. The probe head 7 is preferably integral with the housing 1 in the form of a drum or a star, in which the three symmetrically extending internally threaded probes 8 are located and within each probe 8 is an externally threaded probe drive member 16. In the centre of the probe head 7 is a bearing block 13 of triangular shape with three symmetrically disposed lateral borings arranged to take the spigots of the threaded probe drive members 16. In the centre of the upper side there is yet another boring arranged to take the spigot 10 of the micrometer spindle 4. This triangular bearing is fixed to the probe head 7 by means of the screws 30. The threaded probe drive members 16 are rotatably mounted inside the threaded probes 8 in the bores in the probe head 7 at one end, and at the other in the bores in the triangular bearing 13. Each of the threaded rods 16 has a bevel gear 12 fixed to its end. A bevel gear 6 is also mounted on the end of the micrometer spindle 4. The bevel gears 12 are in constant mesh with the bevel gear 6, as shown in FIG. 1, so that when the micrometer spindle 4 rotates, all the threaded probe drive members 16 rotate with it either at the same speed or at a proportional speed, while the threaded sleeves 8, which are guided so as to slide by means of the guide grooves 15 and screws 14 carried in the housing, are only shifted horizontally and do not rotate. At the upper end the spindle 4 is fixed to a cap 29 by means of a spigot 24. At the end of the spindle 4 there is an open groove 25 to take the spigot 24, so that the cap 29 can be separated from the spindle 4 at any time. The two parts are, however, held together by the screw 27. Round the outside of the cap 29 there is a scale drum 21, the sleeve of which is tapered downwards and carries a scale, and which is rotatably mounted about the upper end of the housing which carries a vernier scale 21a, so that the smallest fraction of the rotational movement of the spindle 4 and hence of the probe drive members 16 can be read off. The scale drum 21 is adjustably mounted on the cap 29 by means of a fixing screw 22, so that the scale is set to zero when the probes are in their starting position. To enable the number of rotations of the spindle 4, and hence of the threaded probe drive members 16, to be read off, an inner drum 3, 19 carrying a scale 2 is placed around the threaded central portion of the spindle 4. The upper end of the inner drum 3, 19 is also threaded. On the back of the inner drum there is a groove not shown in the drawings which guides it to slide up and down by means of a pin in the wall of the housing. Thus the inner drum 3, 19 does not rotate with the spindle 4, but is shifted axially instead. The length of travel is read off from the scale 2 on the inner drum, from which the number of rotations of the spindle 4 and hence of the threaded probe drive members 16 can be obtained. Experience has shown that in spite of accurate workmanship there can be a certain amount of play between the threaded rods and their sleeves, which can also be caused by wear. In the prior art, in order to absorb this play, clamping nuts were used to reduce the diameter of the sleeve somewhat. Unfortunately such a clamping nut requires too much space to be used on the internal micrometer according to the invention. As can be seen in FIG. 3, a new compensating device is illustrated. The end of the threaded sleeve 8 is provided with one or two cross-slits 17, 18, which are cut so deep that the wall separating them has a certain springiness; the width of the slots can be adjusted by the pinch-bolts 31 in order to take up play between the threaded sleeve and the threaded rods. As in instruments of the prior art, in order to control the measuring pressure a ratchet 26 with a screw 27 and spring 28 is provided, in the manner generally known.

Two dovetail grooves 9 are cut in the end of each threaded sleeve 8 in the direction of the spindle axis, in which an end-piece 34 or a point 37 for measuring thread can be adjustably mounted by means of the dovetail clamp 35, which fits the dovetail grooves, as shown in FIG. 4. The end-pieces 34 or the thread-measuring points 37 can be made in various forms. These serve for measuring holes, grooves, threads, etc., in the inner walls of bores. The measurement of internal threads sets a particularly difficult problem, since they have various pitches and profiles. Owing to the pitch, the points 37 must be at a different height in each probe. The slide-grooves 9 serve to fulfill this aim. The thread-measuring points can be exchanged according to the size and profile of the threads and can be slid to and fro in the grooves according to the pitch of the thread.

The scale 36 is inscribed along the bend of the dovetail clamp 35 so that the amount by which the thread-measuring point has shifted can be accurately read off.

In the centre of the dovetail clamp 35, or 34 and 37 respectively, there is a slot which exerts a spring effect and can be set to a suitable position by means of a screw.

I claim:

1. In an internal micrometer the combination with a tubular housing having a through bore, a probe head at one end of said housing for insertion into a bored workpiece opening, said probe head being integral with said housing and extending at right angles thereto and having three through bores in 120° angular relation transverse of said through bore, a probe unit in each of said probe-head bores, each such unit comprising a non-rotatable but axially displaceable and internally threaded sleeve and a threaded pin rotatably but axially immovably engaged in said probe head in threaded engagement with said sleeve, a micrometer spindle rotatably but axially immovably mounted in said housing bore, said spindle having a threaded central portion, first gear means fixed to the inner end of each threaded pin, second gear means fixed to the head end of said spindle and adapted to mesh with all of said first gear means, a cap detachably mounted on the other end of said spindle, an external scale drum adjustably mounted on said cap and rotatable about said other spindle end, and a threaded internal scale drum threadedly engaged to said central spindle portion, said external scale drum bearing a circumferential vernier scale and said internal scale drum bearing a longitudinal linear scale; the result of such arrangement being that when turning said external scale drum and said cap relatively to said housing, said spindle is rotated and in turn rotates said threaded pins in said threaded sleeves via said first and second gear means to move said sleeves into contact with the wall of the bored workpiece opening to measure the diameter of said opening, the measurement being read on said scales.

2. In the internal micrometer set forth in claim 1, a triangular bearing block fixed to said housing in the center of the probe head, said block having a bore in each of its sides and a further bore at right angles to these three bores for rotatably receiving and centering said first and second gear means respectively.

3. An internal micrometer as set forth in claim 1 in which the threaded sleeves of the three probe units are slotted at their inner ends for the purpose of imparting a certain springiness to the wall separating the slots, and a plurality of pinch-bolts are threadedly engaged to each sleeve for the purpose of controlling the play between threaded pin and threaded sleeve.

4. An internal micrometer comprising a housing including a probe head having three radial, intersecting bores symmetrically positioned therein, a probe positioned in each bore, each of the probes being threaded internally and having an external longitudinally extending groove, a member for each probe fixed to the probe head and extending into the groove of its probe thereby preventing rotational movement thereof, an externally threaded probe drive member in threaded engagement with each probe, a bearing block positioned at the intersection of the probe bores, means defining three symmetrically disposed lateral borings in the bearing block, each of said bearings being axially aligned with one of said bores for the support of the inner ends of the drive members, a micrometer having a spindle carried by the housing, means defining a fourth boring positioned in the center of said symmetrically disposed borings of the bearing block, the axis of said fourth boring being perpendicular to the axes of said symmetrically disposed borings for the support of the inner end of the micrometer spindle, a bevel gear fixed to the inner end of each probe drive member, and a bevel gear fixed to the inner end of the micrometer spindle in mesh with the three bevel gears of the probe drive members for the simultaneous rotation thereof.

References Cited by the Examiner

UNITED STATES PATENTS

| 171,898 | 1/1876 | Wiles | 151—21 |
| 641,173 | 1/1900 | Wells | 33—164 |
| 1,423,339 | 7/1922 | Ledell | 33—147 |
| 1,463,673 | 7/1923 | Clase | 33—164 |
| 2,826,820 | 3/1958 | Zelnick | 33—178 |

LEONARD FORMAN, *Primary Examiner.*

SAMUEL S. MATTHEWS, *Assistant Examiner.*